United States Patent [19]

Shimazaki et al.

[11] 4,205,858
[45] Jun. 3, 1980

[54] SHAFT-SEALING SLIDING MEMBER

[75] Inventors: Masao Shimazaki, Toyota; Hiroshi Ueda, Kasugai; Yasumitsu Kuwazuru, Toyota, all of Japan

[73] Assignees: Taiho Kogyo Co., Ltd., Toyota; Kabushiki Kaisha Toyoda Jidoshokki Seisakusho, Kariya, both of Japan

[21] Appl. No.: 968,096

[22] Filed: Dec. 8, 1978

[30] Foreign Application Priority Data

Dec. 8, 1977 [JP] Japan .............................. 52-147550

[51] Int. Cl.² ............................................... F16J 15/34
[52] U.S. Cl. ........................................ 277/96.2; 165/9
[58] Field of Search ...................... 277/96, 96.2; 165/9

[56] References Cited

U.S. PATENT DOCUMENTS

| | | | |
|---|---|---|---|
| 2,398,783 | 4/1946 | Gilbert | 277/96.2 |
| 3,123,364 | 3/1964 | Ennis | 277/96.2 |
| 3,512,790 | 5/1970 | Mancel | 277/96.2 |
| 3,747,944 | 7/1973 | Roy et al. | 277/96.2 |
| 3,778,293 | 12/1973 | Silverstone | 277/96 |
| 3,930,071 | 12/1975 | Rao | 277/96.2 |
| 4,093,243 | 6/1978 | Kishida et al. | 277/96.2 |

*Primary Examiner*—Robert I. Smith
*Attorney, Agent, or Firm*—Blanchard, Flynn, Thiel, Boutell & Tanis

[57] ABSTRACT

A shaft-sealing sliding member which is formed by thermal compression molding by using the mixture consisting of graphite component powder, synthetic resin binder and boron nitride powder. The shaft-sealing sliding member is excellent in several properties such as self-lubricating property and wear resistance. In order to improve these characteristic properties, if necessary, one member or both of silicon dioxide and silicate may be added to the above mixed material.

8 Claims, 6 Drawing Figures

SHAFT-SEALING SLIDING MEMBER

BACKGROUND OF THE INVENTION

This invention relates to an improvement in a shaft-sealing sliding member.

In general cases of sliding portions for shaft sealing, the sealed fluids are utilized as lubricants. Since sliding portions have to prevent the sealed fluid from leakage, the sealing surfaces are subjected to boundary friction or almost solid friction. Accordingly, various severe conditions are required of the sliding members, that is, they have to be excellent in self-lubricating property, wear resistance and strength.

Especially in the shaft-sealing sliding members used for the compressors of car air conditioners, it is hardly allowed to leak the sealed fluids through sealing surfaces. In addition, since the car air conditioners are made light in weight and small in size, the sliding conditions become severer owing to the decrease of lubricant quantity contained in the sealed fluid, the raise of rotational speed and the thermal influences given by car engines.

More particularly, in the compressors of car air conditioners, seat rings are generally fixed to the casings of compressors and follower rings as the shaft-sealing sliding members are disposed opposite to the seat rings in the casings, and further, gaskets are stuffed between the follower rings and the driving shafts of compressors which pass through the axis of each ring, thereby attaining the sealing action. The above-mentioned follower rings are pressed toward the seat rings by the force of springs. Accordingly, the follower rings are brought into close contact with the seat rings and rotated together with drive shafts. The refrigerant gas is thus prevented from leakage to the outer air by the above contact of rings. The lubrication of the compressor of a car air conditioner is generally performed by circulating the refrigerant gas containing oil in the sliding portions of the compressor. Therefore, the lubricant oil that is supplied to the sliding surfaces of seat rings and follower rings is little and is in gaseous state because it is mixed in the refrigerant gas. Further, since the lubricant oil is contained in refrigerant gas, the sliding surfaces are not supplied with the lubricant oil for several tens of seconds, or several minutes in a delayed case, from the start of the compressor. Therefore, the sliding portions between the above-mentioned seat rings and follower rings are left in a non-lubricated state so that they are worked in the state of solid contact. Such the state is likewise caused to occur when the cooling medium within the cooling system is decreased by the leakage from pipings or when the quantity of cooling medium returned to the compressor is decreased by the function of an evaporation pressure controller that is attached to an evaporator.

As described above, the shaft-sealing sliding members for the compressors of car air conditioners are naturally used under severe conditions. With the decreasing of car weights in recent years, the compressors are made smaller, lighter and highly efficient. Especially, as the effective means for improving the cooling capacities of compressors, the quantity of oil in refrigerant gas has a tendency to be reduced because the quantity of oil in the refrigerant gas is in inverse proportion to the cooling capacity. Furthermore, in recent years, the engine room is often provided with other devices such as an exhaust gas treating device and a fuel economizing device, so that the temperature of the engine room is liable to become high, and as the result, the use conditions of shaft-sealing sliding members become more strict.

In the conventional art, there have been employed thermal compression molding products as the shaft-sealing sliding members of this kind which are made of the mixture of the simple graphite powder, rubber or synthetic resin binder and low friction fillers such as lead, lead oxide, molybdenum disulfide, iron oxide red, sericite and zinc oxide powder. However, these conventional ones have not been satisfactory to the above-described severe operation conditions.

That is, the conventional shaft-sealing sliding members give good results in the initial stages of sliding work by the addition of the above low friction fillers, however, when they are used for a long time, the initial sliding surfaces (having the roughness which meets with the requirement of sealing character) are changed into mirror surfaces or rough surfaces according to the kind of used filler, especially this is caused by the lack of lubricant oil. When the sliding surface becomes a mirror surface, there will occur no problem if the supply of lubricant oil is sufficient. However, if the lubricant oil is insufficient like the case of the compressor of a car air conditioner, the sliding becomes the solid contact sliding to increase the sliding area. Therefore, the frictional resistance becomes large and the abnormal wearing and seizure are caused to occur. On the other hand, when the sliding surface becomes rough, if the degree of roughening is not excessive, there is no problem in view of the sliding characteristics. However, when viewed from the point of sealing, the leakage is caused to occur in proportion to the degree of roughening.

With regard to the shaft-sealing sliding members for the compressors of car air conditioners, not only the good sliding property but also the sealing property are generally required as described in the foregoing. That is, the sliding surface of the sealing member is generally finished so as to have a suitable roughness (not more than 1 micron) which is akin to a mirror surface. However, the surface should have the sliding characteristic to maintain the state of finished surface.

BRIEF SUMMARY OF THE INVENTION

It is, therefore, the object of the present invention to provide a shaft-sealing sliding member which is excellent in self-lubricating property and wear resistance.

Another object of the present invention is to provide a shaft-sealing sliding member with which the state of shaft-sealing sliding surface is maintained in a good condition for a long period of time without losing the excellent sealing character.

A further object of the present invention is to provide a shaft-sealing sliding member which has good and low frictional resistance so as to reduce the heat generation in sliding surfaces, thereby preventing the occurrences of thermal deterioration and thermal cracking by the generated heat. At the same time, with the sliding member, the lowering of viscosity of the lubricant medium caused by the rise of temperature can be prevented, thereby improving the sealing character.

Still a further object of the present invention is to provide a shaft-sealing sliding member which is suitable for use in severe conditions of the compressors of car air conditioners.

In accordance with the present invention, the shaft-sealing sliding member is formed by thermal compression molding of the mixed materials consisting of the powder containing 50% or more of simple graphite and remainder percent of carbon (hereinafter referred to as "graphite component powder"), synthetic resin binder and boron nitride powder. The compounding ratios of these materials are 55% to 70% by weight of the graphite component powder, 25% to 40% by weight of the synthetic resin binder and 2% to 15% by weight of the boron nitride powder. According to another aspect of the present invention, one or both of silicon dioxide and silicate can be substituted for some part of the above boron nitride powder.

BRIEF DESCRIPTION OF THE DRAWINGS

The nature, principle and details of the invention will be more clearly apparent from the following detailed description with respect to the preferred examples of the invention with the accompanying drawings, in which.

DETAILED DESCRIPTION OF THE INVENTION

Figure 1:
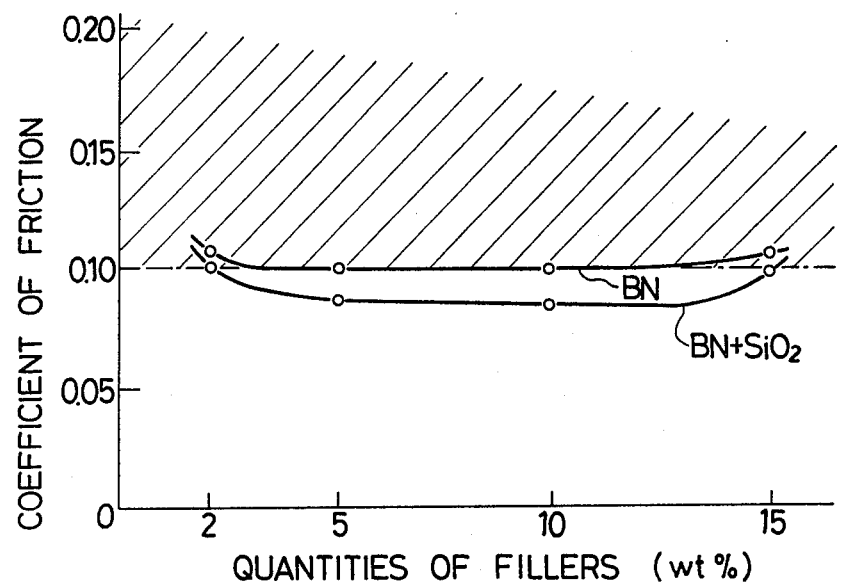
FIG. 1 is a graphic chart showing the coefficients of friction of the materials of the present invention in comparison with those of the conventional ones.

The shaft-sealing sliding member of the present invention is made by the thermal compression molding of a mixture consisting essentially of about 55% to 70% by weight of the graphite component powder containing not less than 50% of graphite, about 25% to 40% by weight of synthetic resin binder and about 2% to 15% by weight of a filler of boron nitride, in which the total of these constituent materials is made 100%. When simple carbon powder is used as the above graphite component powder, the lubricating property of the product becomes worse, while, if simple graphite powder is used in place of the above graphite component powder, the strength of the product is not satisfactory. Furthermore, when carbon is added to the graphite, the hardness of the shaft-sealing sliding member can be improved. However, the maximum quantity of the addition of carbon is about 50%. In general cases, even when the hardness is required, the addition quantity of carbon may be about 20% at the most. Exemplified as preferable synthetic resin binders are phenol resin, furan resin and epoxy resin. They must be excellent in stiffness and rigidity, and must have strong binding property with good adhesiveness and fixing property to the fillers. Further, about 1% of zinc stearate may be added to the above composition as a releasing agent, and the addition of a very small quantity of other soft materials is also allowed.

Furthermore, by using the same quantities of the above 55% to 70% of graphite component powder and 25% to 40% of synthetic resin binder, if 2% to 15% of the fillers of boron nitride powder and one or both silicon dioxide ($SiO_2$) and silicate powder are used in place of the above sole boron nitride powder for making the shaft-sealing sliding member of the invention, a better sliding member having more excellent wear resistance and good sealing property can be obtained. The term silicon dioxide includes the silicon dioxide compound itself, quartz and so forth. The silicate includes sericite and talc (hereinafter generally referred to as "silicates"). It is preferable that the quantity of the silicates is not more than about 80% in the filler which is added to the above-mentioned composition.

The present invention will be described in more detail with reference to several experiments.

(1) A mixture was prepared by blending 60% of simple graphite powder, 30% of phenol resin binder and 10% of boron nitride (BN) as a filler. Another mixture was prepared by the same quantities of simple graphite powder and phenol resin binder and 10% of the fillers of boron nitride and quartz (5% of boron nitride and 5% of quartz). These mixtures were molded under a pressure of 350 kg/cm$^2$ and a temperature of 170° C. for 3 minutes and the molded products were further subjected to thermal curing at about 190° C. for 12 hours, thereby obtaining shaft-sealing sliding members of the invention.

Meanwhile, comparative materials were prepared by mixing each 60% of simple graphite powder and 30% of phenol resin binder and each 10% of lead oxide (PbO), zinc oxide (ZnO), molybdenum disulfide ($MoS_2$), sericite and iron oxide red as fillers. Each of these compositions was well mixed and molded and cured in like manner as the above to obtain similar shaft-sealing sliding members.

In connection with the above sliding members, sliding tests were carried out under non-lubricated condition at 10 kg of load, 2 m/sec of speed and 2 hours of duration. The results thereof are shown in the following Table 1. The specimens of No. 1 and No. 2 belong to the present invention and those of Nos. 3 to 7 are comparative materials.

Table 1

| No. | Filler | Coefficient of Friction | Raised Temperature (°C.) | Rate of Abrasion Loss |
|---|---|---|---|---|
| 1 | BN | 0.09–0.13 | 62–72 | 2.2 $10^{-5}$ mg/m.kg |
| 2 | BN + $SiO_2$ | 0.08–0.09 | 55–60 | 1.5 $10^{-5}$ mg/m.kg |
| 3 | PbO | Seizure | — | — |
| 4 | ZnO | 0.15–0.20 | 80–120 | 25.2 $10^{-5}$ mg/m.kg |
| 5 | $MoS_2$ | Seizure | — | — |
| 6 | Sericite | 0.10–0.14 | 65–90 | 13.0 $10^{-5}$ mg/m.kg |
| 7 | Iron Oxide Red | 0.15–0.20 | 80–121 | 18.7 $10^{-5}$ mg/m.kg |

As understood from the above experiments, the sliding member No. 1 of the present invention has a small coefficient of friction which is a little smaller than that of the sliding member No. 6 showing the smallest value in the conventional sliding members. The coefficient of friction of the sliding member No. 2 is further small. Therefore, it will be understood that the self-lubricating property of the sliding members of the present invention is quite excellent.

In connection with the temperature that is raised by heat generation, the temperature of the sliding member No. 1 is equal to or somewhat lower than the temperature of the sliding member No. 6 which is the lowest in the conventional sliding members. Further, the temperature of the sliding member No. 2 is further low. Furthermore, in connection with the rates of abrasion losses, the sliding members of the present invention are superior to other comparative materials, especially, the value of the sliding member No. 2 is quite excellent. As described above, the shaft-sealing sliding members of the present invention have quite excellent characteristic properties. By the way, the sliding members of the present invention were subjected to the tests of mechanical strength. According to the results, the Shore hardness was 88 to 95 and the flexural strength was 7.5 to 8.5 kg/mm. Therefore, it was confirmed that the products of the present invention can be used satisfactorily.

(2) In the next, several tests were carried out in order to observe the influences of the quantities of the fillers in the present invention, that are exerted to the coefficients of friction and the rates of abrasion losses. The results of the tests are shown in the accompanying drawings, FIG. 1 and FIG. 2.

The quantities of fillers (sole boron nitride and boron nitride plus quartz) in the sliding members of the present invention were varied in the range of 2% to 15%. The remainder parts were composed of graphite component powder and phenol resin binder in the compounding ratio of 2:1. The ratio of the boron nitride to the quartz was 1:1.

The coefficients of friction of the shaft-sealing sliding members of the present invention are shown in FIG. 1, wherein the sliding members containing the filler of sole boron nitride are indicated by the symbol "BN" and the other sliding members containing the fillers of boron nitride and quartz are indicated by the symbol "BN+$SiO_2$".

When the quantitiies of the fillers are in the range of 5% to 10%, the coefficients of friction are lowest, while the values at 2% and 15% of the fillers are higher to some extent. However, they are about 0.10 at the most. The coefficients of friction of the conventional sliding members come within the range that is indicated by the hatched part in FIG. 1, from which it will be understood that the sliding members of the present invention have quite good sliding property as compared with the conventional ones.

Figure 2:
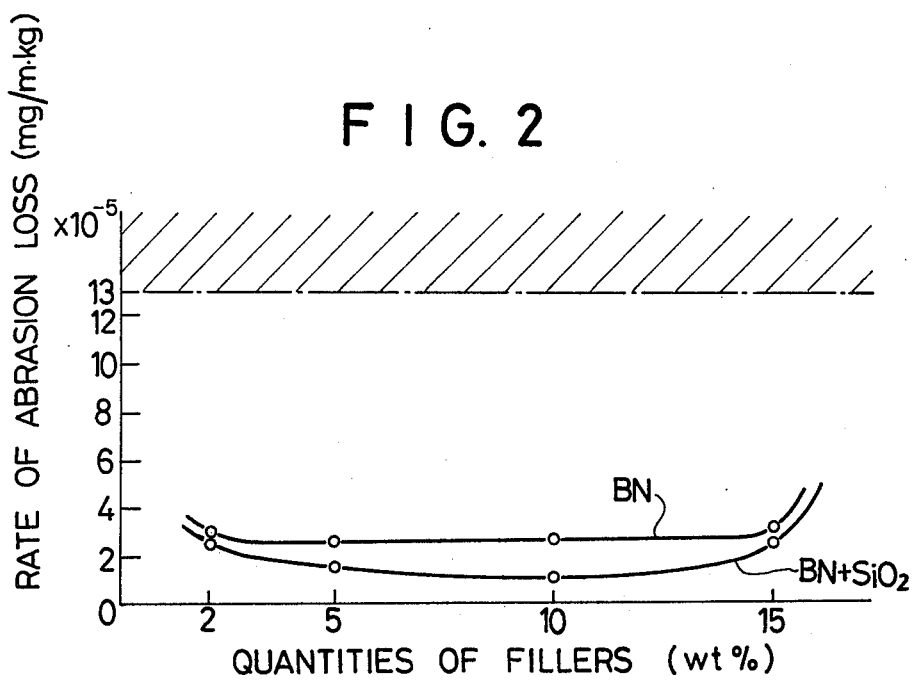
FIG. 2 is also a graphic chart showing the rates of abrasion losses of the materials of the present invention in comparison with those of the conventional ones.

The curves indicated by the symbols BN and BN+$SiO_2$ in FIG. 2 show the rates of abrasion losses of the above-mentioned sliding members of the present invention. The rates of abrasion losses are lowest in the range of 5% to 10% of the fillers and the values of them at 2% and 15% of the fillers are higher to some extent. However, they are 3 mg/m.kg at the most. The rates of abrasion losses of the conventional sliding members come within the hatched range of FIG. 2. When compared with this range, it will be understood that the wear resistance of the sliding members of the present invention is quite good.

As shown by the above typical examples, the most preferable quantity of the fillers is in the range of 2% to 15%. In the present invention, the remainder parts of the sliding members consist of graphite component powder and synthetic resin binder. When the compounding ratios of graphite component powder and synthetic resin binder are about 55% to 70% and about 25% to 40%, respectively, most excellent characteristics can be expected. If the quantity of graphite component powder is less than 55%, the frictional property becomes worse. On the other hand, if the quantity of graphite component powder is more than 75%, the strength of the sliding member becomes low. In the case that the quantity of the binder is less than 25%, the strength of the sliding member is low, while if it exceeds 40%, the frictional property of the sliding member becomes worse.

(3) When about 2% to 15% as total of boron nitride and silicates are used as fillers, the coefficient of friction and the rate of abrasion loss can be reduced as compared with the use of only boron nitride even when the quantity of the silicate is quite small. However, when the quantity of silicate exceeds 80% to the sum of the silicate and boron nitride, the coefficient of friction and the rate of abrasion loss become rather large. Accordingly, the quantity of the silicate in the filler is preferably not more than about 80%.

Figure 3:
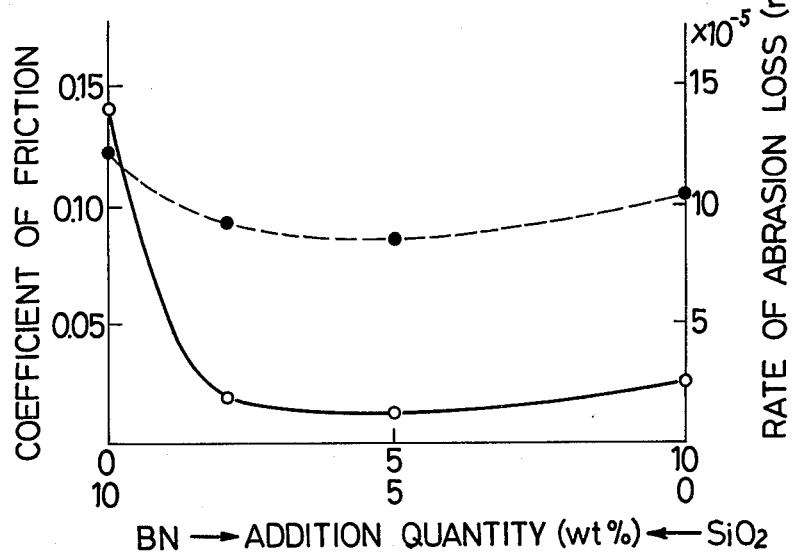
FIG. 3 is a graphic chart showing the effects of fillers in the materials of the present invention.

In FIG. 3, the test results on coefficients of friction and rates of abrasion losses are shown, in which 60% of graphite component powder and 30% of phenol resin binder were used. The filler was 10% as the sum of boron nitride (BN) and quartz powder ($SiO_2$) and the ratio of them was varied. The results indicated by the solid line are rates of abrasion losses and the results indicated by the dash line are coefficients of friction. When the quantity of quartz powder exceeds 80%, both the coefficient of friction and rate of abrasion loss become large. (4) The sliding members No. 1 and No. 2 of the present invention and that of No. 6 containing sericite as the comparative material which are shown in the foregoing Table 1, were subjected to shaft-sealing gas leakage tests, by applying them to the follower rings of compressors of car air conditioners.

Figure 4:
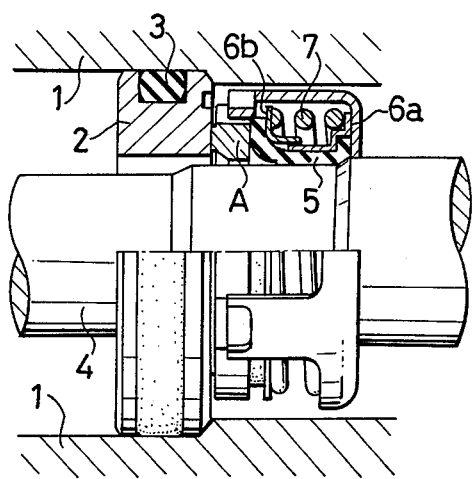
FIG. 4 is a cross-sectional view of the shaft-sealing sliding portion of a compressor of a car air conditioner, which portion is provided with the sliding member of the present invention.

FIG. 4 shows such shaft-sealing sliding portion of a compressor for a car air conditioner. The seat ring 2 is attached to the casing 1. The space between the seat ring 2 and the casing 1 is sealed up by an interposed ring 3. A gasket 5 is fitted around the shaft 4, and a spring 7 that is supported by washers 6a and 6b pushes a follower ring A as the shaft-sealing sliding member toward the side face of the seat ring 2 by way of the washer 6b and the gasket 5. Accordingly, the follower ring A which rotates together with the shaft 4 comes into sliding contact with the seat ring 2, thereby forming a sealing section against the refrigerant gas containing lubricant oil.

Figure 5:
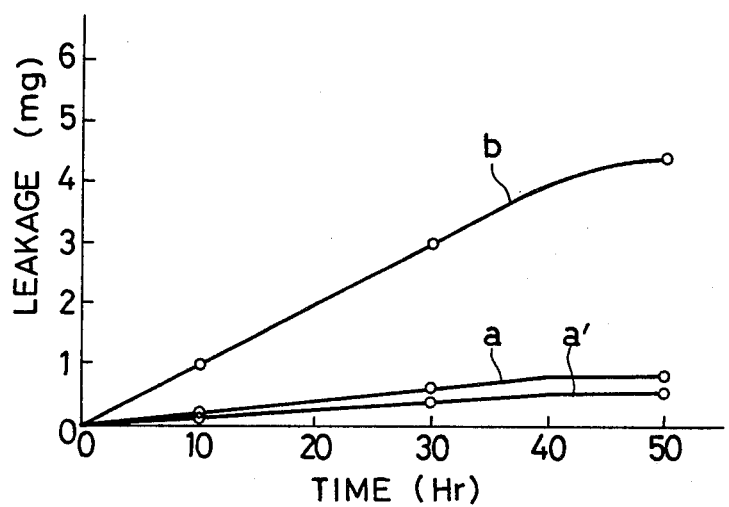
FIG. 5 is a graphic chart showing the results of leakage tests with regard to the materials of the present invention and comparative materials.

In the tests, the number of shaft rotation was 6000 rpm, the sealed fluid was Freon gas, the lubricant oil was refrigerating machine oil and the test pressure was 5.5 kg/cm$^2$. The results of the tests are shown in FIG. 5.

In the drawing, the line indicated by a symbol a shows the results of the sliding member No. 1 of the present invention in the foregoing Table 1 and the line indicated by a symbol a' shows the results of the sliding member No. 2 of also the present invention. The degrees of leakages of them are hardly increased during the test time of 50 hours. However, as shown by the line b of the conventional sliding member No. 6, the leakage of the conventional sliding member rapidly increased with the lapse of time.

Figure 6:
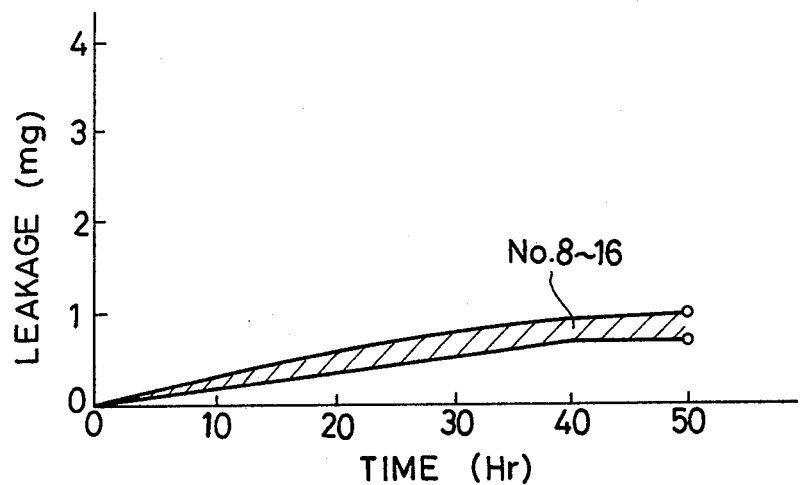
FIG. 6 is a graphic chart showing the results of leakage tests with regard to further exemplar materials of the present invention.

(5) In the above examples, the superiority of the present invention has been confirmed by means of typical specimens of the present invention and of the conventional ones. In order to clarify the scope of the present invention, other various specimens of the present invention having the compositions as shown in the following Table 2 were formed. In connection with these specimens, shaft-sealing gas leakage tests were carried out under the same conditions as those of the foregoing paragraph (4), the results of which are shown in the accompanying FIG. 6. That is, the results of the tests on the specimens No. 8–16 (present invention) in Table 2 have come within the scope of the hatched portion of FIG. 6. Therefore, it will be understood that the leakages of the sliding members according to the present invention are quite lower than the comparative material b shown in FIG. 5.

Table 2

| No. | Graphite Comp. Pdr. | | Organic Binder (Resin) | | | Filler | | | |
|---|---|---|---|---|---|---|---|---|---|
| | Graphite | Carbon | Phenol | Furan | Epoxy | Boron nitride | Quartz sand | Sericite | Talc |
| 8 | 45 | 15 | 32 | | | 5 | 3 | | |
| 9 | 60 | 5 | 28 | | | 5 | 2 | | |
| 10 | 70 | | 28 | | | 2 | | | |
| 11 | 55 | | 40 | | | 3 | 2 | | |
| 12 | 62 | | | 28 | | 5 | | 5 | |
| 13 | 65 | | | | 25 | 3 | 7 | | |
| 14 | 60 | | 30 | | | 5 | | | 5 |
| 15 | 55 | | 30 | | | 7 | 5 | 3 | |
| 16 | 57 | | 30 | | | 5 | 3 | 3 | 2 |

Although the present invention has been described in connection with preferred examples thereof, many variations and modifications will now become apparent to those skilled in the art. It is preferred, therefore, that the present invention be limited not by the specific disclosure herein, but only by the appended claims.

What is claimed is:

1. A shaft-sealing sliding member which is formed by thermal compression molding of a mixture essentially consisting of about 55% to 70% by weight of graphite component powder containing 50% or more of graphite, about 25% to 40% of synthetic resin binder and about 2% to 15% of a filler of boron nitride.

2. The shaft-sealing sliding member as claimed in claim 1, wherein a part of said filler of boron nitride is replaced by one member or both of silicon dioxide powder and silicate powder.

3. The shaft-sealing sliding member as claimed in claim 2, wherein the quantity of said silicate powder is not more than about 80% by weight to the total quantity of said filler.

4. The shaft-sealing sliding member as claimed in any one of claims 2 and 3, wherein said silicon dioxide powder is quartz powder.

5. The shaft-sealing sliding member as claimed in any one of claims 2, and 3, wherein said silicate is sericite or talc.

6. The shaft-sealing sliding member as claimed in any one of claims 1 to 3, wherein said graphite component powder is simple graphite.

7. The shaft-sealing sliding member as claimed in any one of claims 1 to 3, wherein said synthetic resin binder is at least one member selected from the group consisting of phenol resin, furan resin and epoxy resin.

8. The shaft-sealing sliding member as claimed in any one of claims 1 to 3, wherein said sliding member is used for the compressor of a car air conditioner.

* * * * *